(12) United States Patent
Lawrence

(10) Patent No.: US 11,999,899 B2
(45) Date of Patent: Jun. 4, 2024

(54) SOLVENT BLENDS FOR ENHANCED HYDROCARBON RECOVERY PROCESS METHODS

(71) Applicant: PACER TECHNOLOGIES INC., Edmonton (CA)

(72) Inventor: Ronald J. Lawrence, Fulshear, TX (US)

(73) Assignee: Pacer Technologies Inc., Edmonton (CA)

(*) Notice: Subject to any disclaimer, the term of this patent is extended or adjusted under 35 U.S.C. 154(b) by 119 days.

(21) Appl. No.: 17/518,298

(22) Filed: Nov. 3, 2021

(65) Prior Publication Data

US 2022/0135869 A1    May 5, 2022

Related U.S. Application Data

(60) Provisional application No. 63/109,640, filed on Nov. 4, 2020.

(51) Int. Cl.
  *C09K 8/58* (2006.01)
  *C09K 8/34* (2006.01)

(52) U.S. Cl.
  CPC . *C09K 8/58* (2013.01); *C09K 8/34* (2013.01)

(58) Field of Classification Search
  CPC . C09K 8/58; C09K 8/34; C09K 8/524; C09K 8/035
  See application file for complete search history.

(56) References Cited

U.S. PATENT DOCUMENTS

2011/0120402 A1* 5/2011 Brewer ............... C10L 1/19
                                              123/1 A
2015/0175878 A1* 6/2015 Kelly ................ C09K 8/92
                                              166/177.5

FOREIGN PATENT DOCUMENTS

DE       202006016440 U1 *  4/2008  ............. C10L 1/02

OTHER PUBLICATIONS

DE202006016440 English Machine Translation, prepared Apr. 5, 2024. (Year: 2024).*

* cited by examiner

*Primary Examiner* — Christopher M Rodd
(74) *Attorney, Agent, or Firm* — Donald V. Tomkins

(57) ABSTRACT

A solvent blend for breaking down and reducing the viscosity of petroleum substance consists essentially of one or more methyl esters of C14-C18 fatty acids, one or more C9-C20 low aromatic hydrocarbon solvents, and one or more C4-C8 high aromatic hydrocarbon solvents, with the high aromatic solvent fraction being dispersed within the solvent blend in droplet form. The solvent blend may be produced by mixing the high aromatic solvent fraction into an intermediate or base blend consisting essentially of the methyl ester fraction and the low aromatic solvent fraction, with the base blend being produced by mixing the lower aromatic solvent fraction into the methyl ester fraction such that the lower aromatic solvent fraction is dispersed within the methyl ester fraction in droplet form.

15 Claims, No Drawings

SOLVENT BLENDS FOR ENHANCED HYDROCARBON RECOVERY PROCESS METHODS

FIELD OF THE DISCLOSURE

The present disclosure relates in general to solvents for use in the petroleum industry, including for use as an oil treatment agent to reduce the viscosity of light, medium, and heavy oils for purposes of enhanced recovery process methods, and for cleaning viscous petroleum substances from oilfield equipment. The present disclosure further relates to oil and gas recovery and production methods and processes using solvents.

BRIEF SUMMARY OF THE DISCLOSURE

In general terms, the present disclosure teaches solvents made by blending the following three primary components in selected volumetric proportions:
  a selected fatty acid methyl ester (alternatively referred to herein as "FAME");
  a selected low aromatic solvent (or "LAS"); and
  a selected high aromatic solvent (or "HAS").
As used in this disclosure:
  the term fatty acid methyl ester (FAME) specifically refers to methyl esters of C14-C18 fatty acids, where the C14-C18 fatty acids include but are not limited to corn oil, mustard oil, niger seed oil, olive oil, palm oil, peanut oil, poppy seed oil, rapeseed (canola) oil, safflower oil, sesame oil, soybean oil, sunflower seed oil, and wheat germ oil;
  the term low aromatic solvent (LAS) specifically refers to C9-C20 low aromatic hydrocarbon solvents, including but not limited to low aromatic kerosene;
  the term high aromatic solvent (HAS) specifically refers to C4-C8 high aromatic hydrocarbon solvents, including but not limited to benzene, heptane, toluene, and xylene; and
  the term "heavy oil" is to be understood as a general term for highly-viscous crude oil that does not readily flow from subsurface reservoirs into production wells under normal reservoir conditions (as distinct from light crude oils that flow readily out of subsurface reservoirs and at surface).

Solvent blends in accordance with the present disclosure are emulsions, not solutions, with the LAS and HAS constituents being in the form of small droplets suspended in the FAME constituent. This suspension of the LAS and HAS droplets is achieved by use of agitators in the blending process. It should be noted, however, that variant embodiments of solvent blends in accordance with this disclosure may contain only FAME and LAS, depending on the particular intended use of the blends.

HAS is effective for purposes of breaking down heavier fractions of heavy (i.e., highly viscous) petroleum substances such as heavy oil and bitumen. Accordingly, when a FAME/LAS/HAS solvent blend is injected into a heavy oil formation, such breaking-down of heavy fractions will tend to be the first significant effect of the solvent injection, because the HAS will naturally "flash off" before the LAS. However, if a plain (i.e., non-emulsified) HAS were to be injected into the well, it would be prone to flashing off before reaching the petroleum-bearing formation, and therefore would not be available to break down the heavier fractions. This problem is prevented or at least mitigated by suspension of the HAS in droplet form in solvent blends as taught herein.

One particular benefit of using a solvent blend containing a HAS (such as toluene, by way of non-limiting example) is that the HAS will reduce the blend's freezing point and enhance its crystal breaking strength. This makes the use of such blends particularly suited for use in regions such as Canada where winter temperatures can fall to minus 40 degrees and lower. In addition, the inclusion of HAS in the solvent blend may be beneficial in applications where solvency enhancement is required or desired.

Solvent blends in accordance with the present disclosure can be used to reduce or eliminate flow assurance issues in oil and gas processes by inhibiting crystallization or coagulation of long-chain and complex hydrocarbon structures and by dispersing such hydrocarbon structures, as well as reducing surface tension between the different molecular structures, which helps to prevent or reduce crystalized deposition of these molecular structures. The slight dilution of the long-chain and complex hydrocarbon molecules also leads to reduced viscosity in petroleum fluids treated with low dosages of these solvent blends, coupled with the reduction of surface tension and structure lubrication which enables the fluids to flow more easily out of the subsurface reservoir, as well as in processing facilities at surface.

The surface tension reduction capabilities of the solvent blends result in an improved oil quality by reducing or eliminating emulsions of oil, water, and solids in a variety of oil types. As a flow assurance aid, these blends therefore can be used in many different processes, including well stimulation (i.e., direction injection into subsurface petroleum reservoirs), wellbore treatment, flowline treatment, pipeline treatment, and facility treatment, and also as refinery processing aids for enhancing the processability of the treated oils. In testing, these blends have proved to be highly effective for lubricating and protecting metal surfaces, as corrosion inhibitors in production operations, and as lubricants in drilling operations. As well, they can be used in a variety of oilsands processes to protect and clean equipment coming into contact with bitumen, and also to remove oily residues from tanks and storage facilities.

Other potential uses of solvent blends in accordance with the present disclosure include:
  solvent addition to drilling fluid ("mud") systems to provide lubrication during drilling operations; and
  remediation of wells to remove asphaltenes, hydrogen sulfide, paraffins, scales, fines, sulfur, heavy oil by-products, water blocks, drilling mud, cement filtrates, kill fluids, pipe dope, hydrocarbon emulsions, oil-based muds, and/or synthetic oil-based muds.

DESCRIPTION

In accordance with one solvent blending process in accordance with the present disclosure, at least one selected FAME is blended with at least one selected LAS to produce a "base blend", with the volumetric proportions of FAME and LAS in the base blend being between 40% and 60% FAME and, correspondingly, between 60% and 40% LAS. However, the appropriately effective proportions of FAME and LAS in the base blend may vary depending on the particular service or operational conditions in which use of the base blend may be intended. By way of non-limiting example, variant embodiments of the base blend could comprise between 20% and 80% FAME and, correspondingly, between 80% and 20% LAS without departing from the scope of the present disclosure.

Blending of the base blend constituents may be carried out in a reactor vessel using high-shear mixing/agitation means for dispersing the LAS into the FAME in suspended droplet form. As noted previously, the base blend may be used by itself for selected applications, including (by way of non-limiting example) for direct treatment of produced petroleum liquids at surface.

In one non-limiting embodiment of a method for producing solvent blends incorporating a HAS component, a selected amount of at least one selected HAS may be blended into the FAME/LAS base blend, preferably in a reactor vessel using high-shear mixing/agitation equipment for dispersal of the LAS into the FAME fraction of the base blend in suspended droplet form, as well as for dispersal of the HAS into the base blend. In one non-limiting embodiment of a FAME/LAS/HAS blend in accordance with the present disclosure, the HAS fraction may constitute between 40% and 60% of the resultant FAME/LAS/HAS blend, by volume. However, the appropriately effective percentage of HAS for a given application may vary according to the characteristics of the heavy oil to be treated and other variable factors associated with the treatment or processing environment. Accordingly, the HAS fraction may constitute a greater or lesser volumetric proportion of the FAME/LAS/HAS blend without departing from the scope of the present disclosure.

In one exemplary and non-limiting formulation of a FAME/LAS/HAS solvent blend in accordance with the present disclosure:
  the FAME component comprises one or more methyl esters (which by way of non-limiting example may be selected from the group consisting of methyl esters of canola oil, palm oil, and/or soybean oil);
  the LAS component comprises kerosene; and
  the HAS component comprises toluene, xylene, and/or benzene.

Producing a FAME/LAS/HAS blend by blending HAS into a FAME/LAS base blend is advantageous because the base blend tends to be more stable than the FAME/LAS/HAS blend due to greater volatility of the HAS fraction. Accordingly, the FAME/LAS base blend can be readily produced and stored, and then the HAS can be blended into the base blend to produce the final FAME/LAS/HAS solvent blend closer to the time when the final blend needs to be transported for injection into a wellbore (or used in a different application).

In viscosity reduction tests in which samples of heavy oil provided by heavy oil producers in Alberta, Canada were treated with different solvents, the viscosity reduction achieved using a FAME/LAS/HAS blend in accordance with the present disclosure was determined to be as much as 30% greater than that achieved using "incumbent" solvents (i.e., solvents previously used by the heavy oil producers for viscosity reduction).

The testing procedure involved treating samples of heavy oil emulsion drawn directly from the production line of an operating SAGD (steam-assisted gravity drainage) well with an embodiment of a solvent in accordance with the present disclosure at dosages of 250 and 500 ppm (parts per million) by volume. The solvent used in the tests was formulated by preparing a base blend comprising 50% FAME and 50% kerosene (i.e., the LAS component) by volume, and adding toluene (i.e., the HAS component) to create a final FAME/LAS/HAS solvent blend comprising 60% toluene and 40% FAME/LAS base blend by volume (or, more specifically, 20% FAME, 20% kerosene, and 60% toluene). For convenience, this final blend is referred to herein as "Prosolve-1".

For comparison purposes, samples of the same emulsion were treated with the same dosages of three prior art solvent products commonly used in heavy oil production operations. For convenience, these prior art solvents are referred to herein as PAS-1, PAS-2, and PAS-3, which correspond to the following commercial solvent products:
  PAS-1 was "RDV-01® Heavy Oil Hydrocarbon Treatment" produced by GlobalQuimica Partners LLC of Houston, Texas;
  PAS-2 was a blend of RDV-01® and toluene sold as a "Flotexx" product by Advancing Chemistry Inc. (ACI) of Calgary, Alberta; and
  PAS-3 was a blend of RDV-01® and toluene and xylene sold as a "Flotexx" product by ACI.

As well, a "blank" test was performed on an untreated emulsion sample, using the same testing procedure as for the treated samples.

The procedure used to determine the viscosity reductions resulting from treatment of the heavy oil emulsion with Prosolve-1 and with each of the three prior art solvents is summarized below:
  1) Two pressurized sample cylinders were used for the testing of each of the four solvents (PAS-1, PAS-2, PAS-3, and Prosolve-1).
  2) For each solvent being tested, one sample cylinder was charged with sufficient solvent to produce a concentration of 250 ppm (after filling the cylinder with emulsion); and one sample cylinder was charged with sufficient solvent to produce a concentration of 500 ppm.
  3) An additional sample cylinder was used for a "blank" test, and therefore did not receive a solvent charge.
  4) Each of the nine (9) sample cylinders was connected to a production line carrying emulsion from the well at a pressure of 750 kPa (kilopascals) and a temperature of 128° Celsius, and the production line was then opened to completely fill each cylinder with emulsion.
  5) Each filled sample cylinder was vigorously shaken by hand 30 times, and then taken to a laboratory and placed in a refrigerator.
  6) After cooling in the refrigerator for six (6) hours, each sample cylinder was opened up and its contents were poured into a beaker.
  7) The contents of each cylinder were then tested using an Anton Paar SVM 3001 viscometer, with the temperature of all tested samples being approximately 3 degrees Celsius. The measured viscosities of the samples were then recorded, as set out in Table 1 below:

TABLE 1

| Tested Solvent | Treatment Rate (ppm) | Kinetic Viscosity at 10° C. (centistokes) | Viscosity Reduction (relative to blank) |
| --- | --- | --- | --- |
| Blank | 0 | 1020 | N/A |
| PAS-1 | 250 | 893.3 | 12.42% |
| PAS-1 | 500 | 809.8 | 20.61% |
| PAS-2 | 250 | 875.8 | 14.14% |
| PAS-2 | 500 | 830.8 | 18.55% |
| PAS-3 | 250 | 916.6 | 10.14% |
| PAS-3 | 500 | 829.7 | 18.66% |
| Prosolve-1 | 250 | 892.3 | 12.52% |
| Prosolve-2 | 500 | 793.6 | 22.20% |

As indicated in Table 1, treatment of the production emulsion with Prosolve-1 at dosages of 250 ppm resulted in:

a viscosity reduction virtually equal to the viscosity reduction produced by treatment with the same dosage of PAS-1 (12.52% vs. 12.42%);

a viscosity reduction 11.5% less than the viscosity reduction produced by treatment with the same dosage of PAS-2 (12.52% vs. 14.14%); and a viscosity reduction 23.5% greater than the viscosity reduction produced by treatment with the same dosage of PAS-3 (12.52% vs. 10.14%).

Also indicated in Table 1, treatment of the production emulsion with Prosolve-1 at dosages of 500 ppm resulted in:

a viscosity reduction 7.8% greater than the viscosity reduction produced by treatment with the same dosage of PAS-1 (22.20% vs. 20.61%);

a viscosity reduction 19.7% greater than the viscosity reduction produced by treatment with the same dosage of PAS-2 (22.20% vs. 18.55%); and a viscosity reduction 19.0% greater than the viscosity reduction produced by treatment with the same dosage of PAS-3 (22.20% vs. 18.66%).

These test results suggest a clear trend making it reasonable to predict that emulsion treatment at dosages of Prosolve-1 greater than 250 ppm will result in viscosity reductions increasing greater (in percentage terms) than the viscosity reductions resulting from emulsion treatment with PAS-1, PAS-2, and PAS-3 at the same higher dosages.

Moreover, in practical terms the viscosity reductions resulting from emulsion treatment with Prosolve-1, relative to treatment of the same emulsion with PAS-1, PAS-2, and PAS-3 at the same dosage, are effectively greater than indicated in Table 1, PAS-1, PAS-2, and PAS-3 are all high-aromatic solvents whereas Prosolve-1 would be considered a low-aromatic or non-aromatic solvent in comparison, notwithstanding that Prosolve-1 includes a HAS fraction.

This is because the HAS fraction in Prosolve-1 is emulsified, and therefore its viscosity-reducing effects are beneficially slower to develop ("slow release"). In contrast, the high-aromatic fractions of PAS-1, PAS-2, and PAS-3 are quicker to flash off, so their viscosity-reducing effects occur comparatively more quickly than the viscosity-reducing effects of the HAS fraction in Prosolve-1, but they dissipate sooner. Therefore, the beneficial effects of downhole treatment of reservoir fluids with Prosolve-1 can reasonably be expected to be more long-lasting compared to the effects of reservoir treatment with PAS-1, PAS-2, or PAS-3 at the same dosage, because a significant portion of the aromatics in PAS-1, PAS-2, and PAS-3 may flash off before reaching the reservoir, while the emulsified HAS fraction of Prosolve-1 remains in suspension for slow release into the reservoir fluids.

Accordingly, reservoir treatment with Prosolve-1 can be expected to result in greater viscosity reduction downhole—and, therefore, a greater improvement in production efficiency—than reservoir treatment with PAS-1, PAS-2, or PAS-3 at the same dosage.

It will be readily appreciated by those skilled in the art that various modifications to embodiments in accordance with the present disclosure may be devised without departing from the present teachings. It is to be especially understood that the scope of the present disclosure should not be limited by or to any particular embodiments described and/or claimed herein, but should be given the broadest interpretation consistent with the disclosure as a whole.

In this patent document, any form of the word "comprise" is intended to be understood in a non-limiting sense, meaning that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

All figures indicated in the present disclosure with reference to percentages of components of different formulations of solvent blends are intended to be understood as approximate figures, unless the context clearly requires otherwise. For example, reference to a solvent blend containing from 40% to 60% "component A" is to be understood as meaning that the blend contains from approximately 40% "component A" to approximately 60% "component A".

Any use herein of any form of the term "typical" is to be interpreted in the sense of being representative of common usage or practice, and is not to be interpreted as implying essentiality or invariability.

What is claimed is:

1. A solvent blend consisting essentially of a fatty acid methyl ester (FAME) fraction and a low aromatic solvent (LAS) fraction, wherein:
    (a) the FAME fraction consists essentially of one or more methyl esters of C14-C18 fatty acids;
    (b) the LAS fraction consists essentially of one or more C9-C20 low aromatic hydrocarbon solvents; and
    (c) the LAS fraction is dispersed within the FAME fraction in suspended droplet form.

2. The solvent blend as in claim 1 wherein the one or more methyl esters of C14-C18 fatty acids are selected from the group consisting of corn oil, mustard oil, niger seed oil, olive oil, palm oil, peanut oil, poppy seed oil, canola oil, safflower oil, sesame oil, soybean oil, sunflower seed oil, and wheat germ oil.

3. The solvent blend as in claim 1 wherein the LAS fraction makes up between 60% and 40% of the solvent blend.

4. The solvent blend as in claim 1 wherein the one or more C9-C20 low aromatic hydrocarbon solvents comprise kerosene.

5. The solvent blend as in claim 1 wherein:
    (a) the FAME fraction makes up between 40% and 60% of the solvent blend; and
    (b) the LAS fraction makes up between 60% and 40% of the solvent blend.

6. A solvent blend consisting essentially of a fatty acid methyl ester (FAME) fraction, a low aromatic solvent (LAS) fraction, and a high aromatic solvent (HAS) fraction, wherein:
    (a) the FAME fraction consists essentially of one or more methyl esters of C14-C18 fatty acids;
    (b) the LAS fraction consists essentially of one or more C9-C20 low aromatic hydrocarbon solvents;
    (c) the HAS fraction consists essentially of one or more C4-C8 high aromatic hydrocarbon solvents; and
    (d) the HAS fraction is dispersed within the solvent blend in suspended droplet form.

7. The solvent blend as in claim 6 wherein the one or more methyl esters of C14-C18 fatty acids are selected from the group consisting of corn oil, mustard oil, niger seed oil, olive oil, palm oil, peanut oil, poppy seed oil, canola oil, safflower oil, sesame oil, soybean oil, sunflower seed oil, and wheat germ oil.

8. The solvent blend as in claim 6 wherein the one or more C9-C20 low aromatic hydrocarbon solvents comprise kerosene.

9. The solvent blend as in claim 6 wherein the one or more C4-C8 high aromatic hydrocarbon solvents are selected from the group consisting of benzene, heptane, toluene, and xylene.

10. The solvent blend as in claim 6 wherein:
   (a) the FAME fraction and the LAS fraction, in total, make up between 40% and 60% of the solvent blend;
   (b) the volume of the FAME fraction equals between 67% and 150% of the volume of the LAS fraction; and
   (c) the HAS fraction makes up between 60% and 40% of the solvent blend.

11. A method for producing a solvent blend, said method comprising the steps of:
   (a) producing a base blend comprising a fatty acid methyl ester (FAME) fraction and a low aromatic solvent (LAS) fraction by mixing the LAS fraction into the FAME fraction so as to disperse the LAS fraction within the FAME fraction in droplet form; and
   (b) mixing a high aromatic solvent (HAS) fraction into the base blend so as to disperse the HAS fraction within the base blend in droplet form;
   wherein:
   (c) the FAME fraction consists essentially of one or more methyl esters of C14-C18 fatty acids;
   (d) the LAS fraction consists essentially of one or more C9-C20 low aromatic hydrocarbon solvents; and
   (e) the LAS fraction consists essentially of one or more C4-C8 high aromatic hydrocarbon solvents.

12. The method as in claim 11 wherein the one or more methyl esters of C14-C18 fatty acids are selected from the group consisting of corn oil, mustard oil, niger seed oil, olive oil, palm oil, peanut oil, poppy seed oil, canola oil, safflower oil, sesame oil, soybean oil, sunflower seed oil, and wheat germ oil.

13. The method as in claim 11 wherein the one or more C9-C20 low aromatic hydrocarbon solvents comprise low aromatic kerosene.

14. The method as in claim 11 wherein the one or more C4-C8 high aromatic hydrocarbon solvents are selected from the group consisting of benzene, heptane, toluene, and xylene.

15. The method as in claim 11 wherein:
   (a) the FAME fraction and the LAS fraction, in total, make up between 40% and 60% of the solvent blend;
   (b) the volume of the FAME fraction equals between 67% and 150% of the volume of the LAS fraction; and
   (c) the HAS fraction makes up between 60% and 40% of the solvent blend.

* * * * *